United States Patent
Sidiroglou et al.

(10) Patent No.: US 7,904,959 B2
(45) Date of Patent: Mar. 8, 2011

(54) SYSTEMS AND METHODS FOR DETECTING AND INHIBITING ATTACKS USING HONEYPOTS

(75) Inventors: Stylianos Sidiroglou, New York, NY (US); Angelos D. Keromytis, New York, NY (US); Kostas G. Anagnostakis, Philadelphia, PA (US)

(73) Assignee: The Trustees of Columbia University in the City of New York, New York, NY (US)

( * ) Notice: Subject to any disclaimer, the term of this patent is extended or adjusted under 35 U.S.C. 154(b) by 592 days.

(21) Appl. No.: 11/870,043

(22) Filed: Oct. 10, 2007

(65) Prior Publication Data

US 2008/0141374 A1 Jun. 12, 2008

Related U.S. Application Data

(63) Continuation of application No. PCT/US2006/014704, filed on Apr. 18, 2006.

(60) Provisional application No. 60/672,280, filed on Apr. 18, 2005.

(51) Int. Cl.
*G06F 11/00* (2006.01)
*H04L 9/32* (2006.01)

(52) U.S. Cl. ............... 726/22; 726/23; 726/26

(58) Field of Classification Search ............ 726/22–26, 726/11–14; 713/150, 152–154, 187–188
See application file for complete search history.

(56) References Cited

U.S. PATENT DOCUMENTS

| 6,715,084 | B2 | 3/2004 | Aaron et al. |
| 7,042,852 | B2 * | 5/2006 | Hrastar .................. 370/310 |
| 7,467,408 | B1 * | 12/2008 | O'Toole, Jr. ............... 726/22 |
| 2003/0236990 | A1 | 12/2003 | Hrastar et al. |
| 2006/0068755 | A1 | 3/2006 | Shraim et al. |

FOREIGN PATENT DOCUMENTS

| WO | WO 99/55052 | 10/1999 |
| WO | WO 99/63727 | 12/1999 |
| WO | 2007/133178 | 11/2007 |

OTHER PUBLICATIONS

Dreger, H. et al., "Enhancing the Accuracy of Network-based Intrusion Detection with the Host-based Context," Proc. Conference on Detection of Intrusions and Malware and Vulnerability Assessment (DIMVA) 2005.

Xu, J. et al., "Automatic Diagnosis and Response to Memory Corruption Vulnerabilities," CCS'05, Nov. 7-11, 2005, Alexandria, Virginia, USA.

(Continued)

*Primary Examiner* — Hosuk Song
(74) *Attorney, Agent, or Firm* — Byrne Poh LLP

(57) ABSTRACT

In accordance with some embodiments, systems and methods that protect an application from attacks are provided. In some embodiments, traffic from a communication network is received by an anomaly detection component. The anomaly detection component monitors the received traffic and routes the traffic either to the protected application or to a honeypot, where the honeypot shares all state information with the application. If the received traffic is routed to the honeypot, the honeypot monitors the traffic for an attack. If an attack occurs, the honeypot repairs the protected application (e.g., discarding any state changes incurred from the attack, reverting to previously saved state information, etc.).

23 Claims, 8 Drawing Sheets

OTHER PUBLICATIONS

Liang, Z. et al., "Fast and Automated Generation of Attack Signatures: A Basis for Building Self-Protecting Servers," CCS'05, Nov. 7-11, 2005, Alexandria, Virginia, USA.

Provos, N., "SpyBye launches—SpyBye: Finding Malware," http://www.spybye.org/index.php?/archives/2-SpyBye-launches.html, Feb. 17, 2007.

Provos, N., "Decoding Javascript and Why We Like Our Browser—SpyBye: Finding Malware," http://www.spybye.org/index.php?/archives/6-Decoding-Javascript-and-Why-We-Like-Our-Browsers.html, Feb. 22, 2007.

Provos, N., "Anatomy of a typical exploit—SpyBye: Finding Malware," http://www.spybye.org/index.php?/archives/5-Anatomy-of-a-typical-exploit.html, Feb. 19, 2007.

International Search Report and Written Opinion issued for International Patent Application No. PCT/US2006/014704.

International Preliminary Report on Patentability issued for International Patent Application No. PCT/US2006/014704.

Using Network-Based Application Recognition and ACLs for Blocking the "Code Red" Worm. Technical report, Cisco Systems, Inc., updated Aug. 2, 2006.

CERT Advisory CA-2001-19: 'Code Red' Worm Exploiting Buffer Overflow in IIS Indexing Service DLL. http://www.cert.org/advisories/CA-2001-19.html, Jul. 2001.

Cert Advisory. CA-2003-04: MS-SQL Server Worm. http://www.cert.org/advisories/CA-2003-04.html, Jan. 2003.

Microsoft Security Bulletin MS04-028: Buffer Overrun in JPEG Processing Could Allow Code Execution. http://www.microsoft.com/technet/security/bulletin/MS04-028.mspx, Sep. 2004.

US-CERT Technical Cyber Security Alert TA04-217A: Multiple Vulnerabilities in libpng. http://www.us-cert.gov/cas/techalerts/TA04-217A.html, Aug. 2004.

P. Akritidis, K. Anagnostakis, and E. P. Markatos. Efficient content-based fingerprinting of zero-day worms. In *Proceedings of the IEEE International Conference on Communications (ICC)*, May 2005.

M. Bailey, E. Cooke, F. Jahanian, J. Nazario, and D. Watson. The Internet Motion Sensor: A Distributed Blackhole Monitoring System. In *Proceedings of the 12th ISOC Symposium on Network and Distributed Systems Security (SNDSS)*, pp. 167-179, Feb. 2005.

M. Bhattacharyya, M. G. Schultz, E. Eskin, S. Hershkop, and S. J. Stolfo. MET: An Experimental System for Malicious Email Tracking. In *Proceedings of the New Security Paradigms Workshop (NSPW)*, pp. 1-12, Sep. 2002.

C. Clark, W. Lee, D. Schimmel, D. Contis, M. Kone, and A. Thomas. A Hardware Platform for Network Intrusion Detection and Prevention. In *Proceedings of the 3rd Workshop on Network Processors and Applications (NP3)*, Feb. 2004.

E. Cook, M. Bailey, Z. M. Mao, and D. McPherson. Toward Understanding Distributed Blackhole Placement. In *Proceedings of the ACM Workshop on Rapid Malcode (WORM)*, pp. 54-64, Oct. 2004.

D. Dagon, X. Qin, G. Gu, W. Lee, J. Grizzard, J. Levine, and H. Owen. HoneyStat: Local Worm Detection Using Honepots. In *Proceedings of the 7th International Symposium on Recent Advances in Intrusion Detection (RAID)*, pp. 39-58, Oct. 2004.

E. N. Elnozahy, L. Alvisi, Y.-M.Wang, and D. B. Johnson. A survey of rollback-recovery protocols in message-passing systems. *ACM Comput. Surv.*, 34(3):375-408, 2002.

J. Jung, V. Paxson, A. W. Berger, and H. Balakrishnan. Fast Portscan Detection Using Sequential Hypothesis Testing. In *Proceedings of the IEEE Symposium on Security and Privacy*, May 2004.

J. E. Just, L. A. Clough, M. Danforth, K. N. Levitt, R. Maglich, J. C. Reynolds, and J. Rowe. Learning Unknown Attacks—A Start. In *Proceedings of the 5th International Symposium on Recent Advances in Intrusion Detection (RAID)*, Oct. 2002.

H. Kim and B. Karp. Autograph: Toward Automated, Distributed Worm Signature Detection. In *Proceedings of the 13th USENIX Security Symposium*, pp. 271-286, Aug. 2004.

C. Kruegel, F. Valeur, G. Vigna, and R. Kemmerer. Stateful Intrusion Detection for High-Speed Networks. In *Proceedings of the IEEE Symposium on Security and Privacy*, pp. 285-294, May 2002.

C. Kruegel and G. Vigna. Anomaly Detection of Web-based Attacks. In *Proceedings of the 10th ACM Conference on Computer and Communications Security (CCS)*, pp. 251-261, Oct. 2003.

J. G. Levine, J. B. Grizzard, and H. L. Owen. Using Honeynets to Protect Large Enterprise Networks. *IEEE Security & Privacy*, 2(6):73-75, Nov./Dec. 2004.

D. Malkhi and M. K. Reiter. Secure execution of java applets using a remote playground. *IEEE Trans. Softw. Eng.*, 26(12):1197-1209, 2000.

A. J. Malton. The Denotational Semantics of a Functional Tree-Manipulation Language. *Computer Languages*, 19(3):157-168, 1993.

D. Moore, C. Shannon, G. Voelker, and S. Savage. Internet Quarantine: Requirements for Containing Self-Propagating Code. In *Proceedings of the IEEE Infocom Conference*, Apr. 2003.

J. Newsome and D. Dong. Dynamic Taint Analysis for Automatic Detection, Analysis, and Signature Generation of Exploits on Commodity Software. In *Proceedings of the 12th ISOC Symposium on Network and Distributed System Security (SNDSS)*, pp. 221-237, Feb. 2005.

A. Pasupulati, J. Coit, K. Levitt, S. F. Wu, S. H. Li, J. C. Kuo, and K. P. Fan. Buttercup: On Network-based Detection of Polymorphic Buffer Overflow Vulnerabilities. In *Proceedings of the Network Operations and Management Symposium (NOMS)*, pp. 235-248, vol. 1, Apr. 2004.

J. Pincus and B. Baker. Beyond Stack Smashing: Recent Advances in Exploiting Buffer Overflows. *IEEE Security & Privacy*, 2(4):20-27, Jul./Aug. 2004.

P. Porras, L. Briesemeister, K. Levitt, J. Rowe, and Y.-C. A. Ting. A Hybrid Quarantine Defense. In *Proceedings of the ACM Workshop on Rapid Malcode (WORM)*, pp. 73-82, Oct. 2004.

N. Provos. A Virtual Honeypot Framework. In *Proceedings of the 13th USENIX Security Symposium*, pp. 1-14, Aug. 2004.

J. Reynolds, J. Just, E. Lawson, L. Clough, and R. Maglich. Online Intrusion Protection by Detecting Attacks with Diversity. In *Proceedings of the 16th Annual IFIP 11.3 Working Conference on Data and Application Security Conference*, Apr. 2002.

J. C. Reynolds, J. Just, L. Clough, and R. Maglich. On-Line Intrusion Detection and Attack Prevention Using Diversity, Generate-and-Test, and Generalization. In *Proceedings of the 36th Annual Hawaii International Conference on System Sciences (HICSS)*, Jan. 2003.

J. C. Reynolds, J. Just, E. Lawson, L. Clough, and R. Maglich. The Design and Implementation of an Intrusion Tolerant System. In *Proceedings of the International Conference on Dependable Systems and Networks (DSN)*, Jun. 2002.

M. Roesch. Snort: Lightweight intrusion detection for networks. In *Proceedings of USENIX LISA*, Nov. 1999. (software available from http://www.snort.org/).

L. Schaelicke, T. Slabach, B. Moore, and C. Freeland. Characterizing the Performance of Network Intrusion Detection Sensors. In *Proceedings of Recent Advances in Intrusion Detection (RAID)*, Sep. 2003.

S. E. Schechter, J. Jung, and A.W. Berger. Fast Detection of Scanning Worm Infections. In *Proceedings of the 7th International Symposium on Recent Advances in Intrusion Detection (RAID)*, pp. 59-81, Oct. 2004.

S. Sidiroglou and A. D. Keromytis. A Network Worm Vaccine Architecture. In *Proceedings of the IEEE Workshop on Enterprise Technologies: Infrastructure for Collaborative Enterprises (WETICE), Workshop on Enterprise Security*, pp. 220-225, Jun. 2003.

S. Singh, C. Estan, G. Varghese, and S. Savage. Automated worm fingerprinting. In *Proceedings of the 6th Symposium on Operating Systems Design & Implementation (OSDI)*, Dec. 2004.

A. Smirnov and T. Chiueh. DIRA: Automatic Detection, Identification, and Repair of Control-Hijacking Attacks. In *Proceedings of the 12th ISOC Symposium on Network and Distributed System Security (SNDSS)*, Feb. 2005.

T. Spalink, S. Karlin, L. Peterson, and Y. Gottlieb. Building a Robust Software-Based Router Using Network Processors. In *Proceedings of the 18th ACM Symposium on Operating Systems Principles (SOSP)*, pp. 216-229, Chateau Lake Louise, Banff, Alberta, Canada, Oct. 2001.

D. Spinellis. Reliable identification of bounded-length viruses is NP-complete. *IEEE Transactions on Information Theory*, 49(1):280-284, Jan. 2003.

L. Spitzner. Honeypots: *Tracking Hackers*. Addison-Wesley, 2003. pp. VII-XIV, 33-86, and 387-398.

S. Staniford. Containment of Scanning Worms in Enterprise Networks. *Journal of Computer Security*, 2003.

S. Staniford, D. Moore, V. Paxson, and N.Weaver. The Top Speed of Flash Worms. In *Proceedings of the ACM Workshop on Rapid Malcode (WORM)*, pp. 33-42, Oct. 2004.

S. Staniford, V. Paxson, and N. Weaver. How to Own the Internet in Your Spare Time. In *Proceedings of the 11th USENIX Security Symposium*, pp. 149-167, Aug. 2002.

W. Sun, Z. Liang, R. Sekar, and V. N. Venkatakrishnan. One-way Isolation: An Effective Approach for Realizing Safe Execution Environments. In *Proceedings of the 12th ISOC Symposium on Network and Distributed Systems Security (SNDSS)*, pp. 265-278, Feb. 2005.

P. Szor and P. Ferrie. Hunting for Metamorphic. Technical report, Symantec Corporation, Jun. 2003.

Top Layer Networks. http://www.toplayer.com., Top Layer Networks' "AppSwitch" Automatically Guarantees Bandwidth for Specific Applications and Transaction Types, Press Releases, Apr. 5,1999.

Top Layer Networks. http://www.toplayer.com., Feb. 20, 2003.

T. Toth and C. Kruegel. Accurate Buffer Overflow Detection via Abstract Payload Execution. In *Proceedings of the 5th Symposium on Recent Advances in Intrusion Detection (RAID)*, Oct. 2002.

T. Toth and C. Kruegel. Connection-history Based Anomaly Detection. In *Proceedings of the IEEE Workshop on Information Assurance and Security*, Jun. 2002.

S. Venkataraman, D. Song, P. B. Gibbons, and A. Blum. New Streaming Algorithms for Fast Detection of Superspreaders. In *Proceedings of the 12th ISOC Symposium on Network and Distributed Systems Security (SNDSS)*, pp. 149-166, Feb. 2005.

G. Vigna, W. Robertson, and D. Balzarotti. Testing Networkbased Intrusion Detection Signatures Using Mutant Exploits. In *Proceedings of the 11th ACM Conference on Computer and Communications Security (CCS)*, pp. 21-30, Oct. 2004.

H. J. Wang, C. Guo, D. R. Simon, and A. Zugenmaier. Shield: Vulnerability-Driven Network Filters for Preventing Known Vulnerability Exploits. In *Proceedings of the ACM SIGCOMM Conference*, pp. 193-204, Aug. 2004.

N. Weaver, S. Staniford, and V. Paxson. Very Fast Containment of Scanning Worms. In *Proceedings of the 13th USENIX Security Symposium*, pp. 29-44, Aug. 2004.

D. Whyte, E. Kranakis, and P. van Oorschot. DNS-based Detection of Scanning Worms in an Enterprise Network. In *Proceedings of the 12th ISOC Symposium on Network and Distributed Systems Security (SNDSS)*, pp. 181-195, Feb. 2005.

J. Wu, S. Vangala, L. Gao, and K. Kwiat. An Effective Architecture and Algorithm for Detecting Worms with Various Scan Techniques. In *Proceedings of the ISOC Symposium on Network and Distributed System Security (SNDSS)*, pp. 143-156, Feb. 2004.

V. Yegneswaran, P. Barford, and S. Jha. Global Intrusion Detection in the DOMINO Overlay System. In *Proceedings of the ISOC Symposium on Network and Distributed System Security (SNDSS)*, Feb. 2004.

V. Yegneswaran, P. Barford, and D. Plonka. On the Design and Use of Internet Sinks for Network Abuse Monitoring. In *Proceedings of the 7th International Symposium on Recent Advances in Intrusion Detection (RAID)*, pp. 146-165, Oct. 2004.

C. C. Zou, L. Gao, W. Gong, and D. Towsley. Monitoring and Early Warning for Internet Worms. In *Proceedings of the $10^{th}$ ACM International Conference on Computer and Communications Security (CCS)*, pp. 190-199, Oct. 2003.

K. Anagnostakis, M. B. Greenwald, S. Ioannidis, A. D. Keromytis, and D. Li. A Cooperative Immunization System for an Untrusting Internet. In Proceedings of the 11th IEEE International Conference on Networks (ICON), pp. 403-408, Oct. 2003.

K. G. Anagnostakis, S. Sidiroglou, P. Akritidis, K. Xinidis, E. Markatos, and A. D. Keromytis. Detecting Targeted Attacks Using Shadow Honeypots. In Proceedings of the 14th USENIX Security Symposium. pp. 129-144, Aug. 2005.

E. G. Barrantes, D. H. Ackley, S. Forrest, T. S. Palmer, D. Stefanovic, and D. D. Zovi. Randomized Instruction Set Emulation to Distrupt Binary Code Injection Attacks. In Proceedings of the 10th ACM Conference on Computer and Communications Security (CCS), Oct. 2003.

S. Bhatkar, D. C. DuVarney, and R. Sekar. Address Obfuscation: an Efficient Approach to Combat a Broad Range of Memory Error Exploits. In Proceedings of the 12th USENIX Security Symposium, pp. 105-120, Aug. 2003.

S. Boyd and A. Keromytis. SQLrand: Preventing SQL Injection Attacks. In Applied Cryptography and Network Security (ACNS), pp. 292-302, Jun. 2004.

G. Candea and A. Fox. Crash-Only Software. In Proceedings of the 9th Workshop on Hot Topics in Operating Systems (HOTOS-IX), May 2003.

F. Cuppens and A. Miege. Alert Correlation in a Cooperative Intrusion Detection Framework. In IEEE Security and Privacy, 2002.

B. Demsky and M. C. Rinard. Automatic Data Structure Repair for Self-Healing Systems. In Proceedings of the 1st Workshop on Algorithms and Architectures for Self-Managing Systems, Jun. 2003.

S. Forrest, A. Somayaji, and D. Ackley. Building Diverse Computer Systems. In Proceedings of the 6th Workshop on Hot Topics in Operating Systems, pp. 67-72, 1997.

M. Handley, V. Paxson, and C. Kreibich. Network Intrusion Detection: Evasion, Traffic Normalization, and End-to-End Protocol Semantics. In Proceedings of the USENIX Security Conference, 2001.

S. Ioannidis, A. D. Keromytis, S. M. Bellovin, and J. M. Smith. Implementing a Distributed Firewall. In Proceedings of the 7th ACM International Conference on Computer and Communications Security (CCS), pp. 190-199, Nov. 2000.

G. S. Kc, A. D. Keromytis, and V. Prevelakis. Countering Code-Injection Attacks With Instruction-Set Randomization. In Proceedings of the 10th ACM Conference on Computer and Communications Security (CCS), Oct. 2003.

S. T. King, Z. M. Mao, D. G. Lucchetti, and P. M. Chen. Enriching Intrusion Alerts Through Multi-host Causality. In Proceedings of the Symposium on Network and Distributed Systems Security (NDSS), 2005.

V. Kiriansky, D. Bruening, and S. Amarasinghe. Secure Execution Via Program Shepherding. In Proceedings of the 11th USENIX Security Symposium, Aug. 2002.

A. Kolesnikov and W. Lee. Advanced Polymorphic Worms: Evading IDS by Blending in with Normal Traffic. Technical report, Georgia Tech College of Computing, 2004.

C. Krugel, T. Toth, and E. Kirda. Service Specific Anomaly Detection for Network Intrusion Detection. In Proceedings of the ACM Symposium on Applied Computing (SAC), 2002.

M. E. Locasto, J. J. Parekh, A. D. Keromytis, and S. J. Stolfo. Towards Collaborative Security and P2P Intrusion Detection. In Proceedings of the IEEE Information Assurance Workshop (IAW), pp. 333-339, Jun. 2005.

M. E. Locasto, S. Sidiroglou, and A. D. Keromytis. Application Communities: Using Monoculture for Dependability. In Proceedings of the 1st Workshop on Hot Topics in System Dependability (HotDep-05), Jun. 2005.

R. E. Overill. How Re(Pro)active Should an IDS Be? In Proceedings of the 1st International Workshop on Recent Advances in Intrusion Detection (RAID), Sep. 1998.

T. Pietraszek. Using Adaptive Alert Classification to Reduce False Positives in Intrusion Detection. In Proceedings of the Symposium on Recent Advances in Intrusion Detection (RAID), Sep. 2004.

J. C. Rabek, R. I. Khazan, S. M. Lewandowski, and R. K. Cunningham. Detection of Injected, Dynamically Generated, and Obfuscated Malicious Code. In Proceedings of the Workshop on Rapid Malcode (WORM), 2003.

M. Rinard, C. Cadar, D. Dumitran, D. Roy, T. Leu, and J. W Beebee. Enhancing Server Availability and Security Through Failure-Oblivious Computing. In Proceedings 6th Symposium on Operating Systems Design and Implementation (OSDI), Dec. 2004.

S. Sidiroglou, J. Ioannidis, A. D. Keromytis, and S. J. Stolfo. An Email Worm Vaccine Architecture. In Proceedings of the 1st Information Security Practice and Experience Conference (ISPEC), Apr. 2005.

S. Sidiroglou, M. E. Locasto, S. W. Boyd, and A. D. Keromytis. Building a Reactive Immune System for Software Services. In Proceedings of the USENIX Annual Technical Conference, pp. 149-161, Apr. 2005.

A. Somayaji and S. Forrest. Automated Response Using System-Call Delays. In Proceedings of the 9th USENIX Security Symposium, Aug. 2000.

R. Sommer and V. Paxson. Enhancing Byte-Level Network Intrusion Detection Signatures with Context. In Proceedings of the ACM Conference on Computer and Communications Security (CCS), pp. 262-271, 2003.

Stig Andersson, Andrew Clark, George Mohay. Network-based Buffer Overflow Detection by Exploit Code Anaylsis. In AusCERT Conference, May 2004.

S. Stolfo. Worm and Attack Early Warning: Piercing Stealthy Reconnaissance. IEEE Privacy and Security, May/Jun. 2004.

G. E. Suh, J. W. Lee, D. Zhang, and S. Devadas. Secure Program Execution Via Dynamic Information Flow Tracking. SIGOPS Operating Systems Review, 38(5):85-96, 2004.

K. Wang and S. J. Stolfo. Anomalous Payload-based Network Intrusion Detection. In Proceedings of the 7th International Symposium on Recent Advances in Intrusion Detection (RAID), pp. 203-222, Sep. 2004.

J. Newsome, D. Brumley et al. Vulnerability-Specific Execution Filtering for Exploit Prevention on Commodity Software. School of Computer Science, pp. 2-28, May 2005.

M. Costa, J. Crowcroft, M. Castro, A. Rowstron, L. Zhou, L. Zhang, and P. Barham, "Vigilante: End-to-End Containment of Internet Worms", SOSP'05, Brighton, UK, Oct. 2005.

J. Xu, P. Ning, et al. Automatic Diagnosis and Response to Memory corruption Vulnerabilities. N.C. State Univ., Cyber Defense Lab, pp. 1-12, 2005.

H. Dreger, C. Kreibich, V. Paxson, and R. Sommer. Enhancing the accuracy of network-based intrusion detection with host-based context. In Proceedings of GI SIG SIDAR Conference on Detection of Intrusions and Malware and Vulnerability Assessment (DIMVA), 2005.

Alexey Smirnov, Tzi-cker Chiueh, DIRA: Automatic Detection, Identification, and Repair of Control-Hijacking Attacks, in Proceedings of NDSS'05, San Diego, CA, Feb. 2005.

Michael E. Locasto, Ke Wang, Angelos D. Keromytis, and Salvatore J. Stolfo. FLIPS: Hybrid Adaptive Intrusion Prevention, In Proceedings of the 8th International Symposium on Recent Advances in Intrusion Detection (RAID), Sep. 2005, Seattle, WA.

M. Costa, J. Crowcroft, M. Castro and A. Rowstron, "Can we contain Internet worms?", HotNets III, San Diego, California, USA, Nov. 2004.

Y. Wang, Strider HoneyMonkeys: Active Client-Side Honeypots for Finding Web Sites That Exploit Browser Vulnerabilities, USENIX Security Symposium, Work-In-Progress-Reports, Aug. 5, 2005.

A. Moshchuk, T. Bragin et al. SpyProxy: Execution-based Detection of Malicious Web Content. Univ. of Wash., Dept. of Computer Science & Engineering, 16$^{th}$ USENIX Security Symposium, pp. 27-42, Aug. 5-10, 2007.

Y. M. Wang, D. Beck, X. Jiang, R. Roussev, C. Verbowski, S. Chen, and S. King, "Automated Web Patrol with Strider HoneyMonkeys: Finding Web Sites That Exploit Browser Vulnerabilities", Proceedings of the 13th Annual Network and Distributed System Security Symposium (NDSS 2006), San Diego, CA, Feb. 2006.

P. Akritidis, E.P. Markatos, M. Polychronakis, and K. Anagnostakis. STRIDE: Polymorphic Sled Detection through Instruction Sequence Analysis, In Proceedings of the 20th IFIP International Information Security Conference (IFIP/SEC), Jun. 2005.

J. Bethencourt, J. Franklin, and M. Vernon. Mapping Internet Sensors With Probe Response Attacks. In Proceedings of the 14th USENIX Security Symposium, pp. 193-208, Aug. 2005.

M. Cai, K. Hwang, Y.-K. Kwok, S. Song, and Y. Chen. Collaborative Internet Worm Containment. IEEE Security & Privacy Magazine, 3(3): 25-33, May/Jun. 2005.

S. Chen, J. Xu, N. Nakka, Z. Kalbarczyk, and C. Verbowski. Defeating Memory Corruption Attacks via Pointer Taintedness Detection. In Proceedings of the International Conference on Dependable Systems and Networks (DSN), pp. 378-387, Jun. 2005.

J. R. Crandall, S. F. Wu, and F. T. Chong. Experiences Using Minos as a Tool for Capturing and Analyzing Novel Worms for Unknown Vulnerabilities. In Proceedings of the Conference on Detection of Intrusions and Malware & Vulnerability Assessment (DIMVA), Jul. 2005.

D. Moore, G. Voelker, and S. Savage. Inferring Internal Denial-of-Service Activity. In Proceedings of the 10th USENIX Security Symposium, pp. 9-22, Aug. 2001.

J. Newsome, B. Karp, and D. Song. Polygraph: Automatically Generating Signatures for Polymorphic worms. In Proceedings of the IEEE Security & Privacy Symposium, pp. 226-241, May 2005.

U. Payer, P. Teufl, and M. Lamberger. Hybrid Engine for Polymorphic Shellcode Detection. In Proceedings of the Conference on Detection of Intrusions and Malware & Vulnerability Assessment (DIMVA), Jul. 2005.

M. A. Rajab, F. Monrose, and A. Terzis. On the Effectiveness of Distributed Worm Monitoring. In Proceedings of the 14th USENIX Security Symposium, pp. 225-237, Aug. 2005.

Y. Shinoda, K. Ikai, and M Itoh. Vulnerabilities of Passive Internet Threat Monitors. In Proceedings of the 14th USENIX Security Symposium, pp. 209-224, Aug. 2005.

V. Yegneswaran, J. T. Giffin, P. Baraford, and S. Jha. An Architecture for Generating Semantics-Aware Signatures. In Proceedings of the 14th Usenix Security Symposium, pp. 97-112, Aug. 2005.

International Search Report and the Written Opinion of the International Searching Authority, International Patent Application No. PCT/US06/15080, Jul. 7, 2008.

Younan et al. A Methodology for Designing Countermeasures Against Current and Future Code Injection Attacks, IEEE. Mar. 23-24, 2005 pp. 3-20.

Office Action issued by the Mexican Institute of Industrial Property in related Mexican Patent Application No. MX/a/2007/013025, May 20, 2010.

Using Network-Based Application Recognition and Across Control Lists for Blocking the "Code Red" Worm, Cisco Systems, Inc., Aug. 2, 2006.

* cited by examiner

SYSTEMS AND METHODS FOR DETECTING AND INHIBITING ATTACKS USING HONEYPOTS

CROSS-REFERENCE TO RELATED APPLICATION

This application is a continuation of International Patent Application No. PCT/US2006/014704, filed Apr. 18, 2006, which claims the benefit under 35 U.S.C. §119(e) of U.S. Provisional Patent Application No. 60/672,280, filed Apr. 18, 2005, each of which is hereby incorporated by reference herein in its entirety.

TECHNICAL FIELD

The disclosed subject matter relates to the field of computer security. More particularly, the disclosed subject matter relates to systems and methods for detecting and inhibiting software attacks.

BACKGROUND

Computer viruses, worms, trojans, hackers, key recovery attacks, malicious executables, probes, etc. are a menace to users of computers connected to public computer networks (such as the Internet) and/or private networks (such as corporate computer networks). In response to these threats, many computers are protected by antivirus software and firewalls. However, these preventative measures are not always adequate. For example, there have been many instances where worms and other attacks have taken advantage of a known vulnerability in computer software (e.g., in firewall technology) the day after the public became aware of the vulnerability. Because of such a rapid launch, the patch necessary to correct the vulnerability could not be deployed in time to prevent the attack. Similar, most antivirus software relies on updates to that software so that signatures of known viruses can be utilized to recognize threats. In the case of a "zero-day" worm or virus (e.g., a worm or virus that has just been launched), most computer systems are completely vulnerable to attack because no known patch or signature update has yet been made available.

Due to the level of malicious activity on the Internet, organizations are deploying mechanisms for detecting and responding to new attacks or suspicious activity, sometimes referred to as intrusion prevention systems. However, many of these intrusion prevention systems are limited to protecting against already known attacks because they use rule-based intrusion detection systems.

Detection mechanisms, such as honeypots and anomaly detection systems, have been developed for use in more powerful reactive-defense systems. In contrast with intrusion detection systems, honeypots and anomaly detection systems offer the possibility of detecting and responding to previously unknown attacks or "zero-day" attacks. A honeypot is generally defined as a trap that is set to detect or deflect attempts at unauthorized use of information systems. However, it should be noted that honeypots do not see legitimate traffic or activity. One reason for this is because honeypots are often placed at a network location that legitimate traffic would have no reason to access. Another reason is that honeypots are usually too slow to process traffic in the time required for real world applications. Yet another reason is that honeypots do not have the capabilities to fully service the legitimate traffic because, for example, honeypots do not fully share state with the actual system. Anomaly detection systems protect a resource by monitoring attempted accesses to it and using heuristics to classify the accesses as normal or anomalous. Honeypots and anomaly detection systems offer different tradeoffs between accuracy and the scope of attacks that can be detected.

Honeypots can be heavily instrumented to accurately detect attacks, but they depend on an attacker attempting to exploit a vulnerability against them. This makes honeypots good for detecting scanning worms, but ineffective against manually directed attacks or topological and hit-list worms. Furthermore, honeypots are typically used only for server-type applications.

Anomaly detection systems can theoretically detect both types of attacks, but are usually much less accurate than honeypots. Most anomaly detection systems offer a tradeoff between false positive and false negative detection rates. For example, it is often possible to tune the system to detect more potential attacks, however, this is at an increased risk of misclassifying legitimate traffic. While it is possible to make an anomaly detection system more insensitive to attacks, this creates the risk of missing some actual attacks. Because anomaly detection systems can adversely affect legitimate traffic by, for example, dropping legitimate requests, system designers often tune the system for low false positive rates which may misclassify attacks as legitimate traffic.

Accordingly, it is desirable to provide systems and methods that overcome these and other deficiencies of the prior art.

SUMMARY

In some embodiments of the disclosed subject matter, systems and methods for protecting applications from attacks are provided. The received traffic (e.g., network traffic) is transmitted through an anomaly detection component. The anomaly detection component predicts whether the received traffic is a potential attack on the application and the anomaly detection component is tuned to achieve a low false negative rate. In response to receiving an indication from the anomaly detection component that the traffic may be an attack, transmitting the received traffic to a honeypot. The honeypot can be an instrumented instance of the application that shares state information with the application. It should be noted that, in some embodiments, the honeypot can be at least a portion of the protected application itself. The honeypot monitors the received traffic for attacks on the application. In response to receiving an indication from the honeypot that the received traffic is an attack on the application, the honeypot provides an instruction to repair the state information of the application.

In some embodiments, the repair can include rolling back the state information of the application to previously saved state information. In some embodiments, the repair can include discarding the state information of the application. In some embodiments, the repair can include initiating a new instance of the application with previously saved state information.

In some embodiments, a filter can be provided that filters traffic prior to transmitting the received traffic to the anomaly detection component. The filtering can be based on at least one of payload content and source of the attack.

In some embodiments, feedback may be provided by the honeypot. In some embodiments, feedback from the honeypot can be used to update the anomaly detection component (e.g., the predictors and models associated with the anomaly detection component) and/or the filter. In some embodiments, the feedback can be used to automatically tune the anomaly detection component and/or the filter.

DETAILED DESCRIPTION

In accordance with some embodiments of the disclosed subject matter, systems and methods for improved protection from attacks on an application are provided. These systems and methods provide at least one anomaly detector and at least one honeypot (sometimes referred to as a "shadow honeypot"). These shadow honeypots enable signs of an attack to be detected and enable the application to be protected from such an attack. The anomaly detector monitors all traffic routed to a protected application. Instead of allowing the application to process traffic that is considered anomalous, anomalous traffic is processed by the honeypot. As used herein, the honeypot is an instance of the protected application that shares substantially all internal state with a regular instance of the application. However, the honeypot can be provided in various approaches. For example, in some embodiments, the honeypot application can be at least a portion of the protected application itself. Using the honeypot, attacks against the honeypot are detected and the honeypot repairs the application (e.g., any incurred state changes are discarded). In other embodiments, the application can be restarted and loaded with state information that was saved prior to the attack. Legitimate traffic that is misclassified by the anomaly detector can be validated by the honeypot and can be processed correctly by the system and transparently to the user. It should be noted that a shadow honeypot can be used for protection of both server and client applications.

Some embodiments of the disclosed subject matter allow system designers to tune the anomaly detection system for low false negative rates, thereby minimizing the risk of misclassifying a real attack as legitimate traffic, since the honeypot removes any false positives (or a falsely triggered indication of an attack). Some embodiments can defend against attacks that are tailored against a specific site with a particular internal state.

Figure 1:
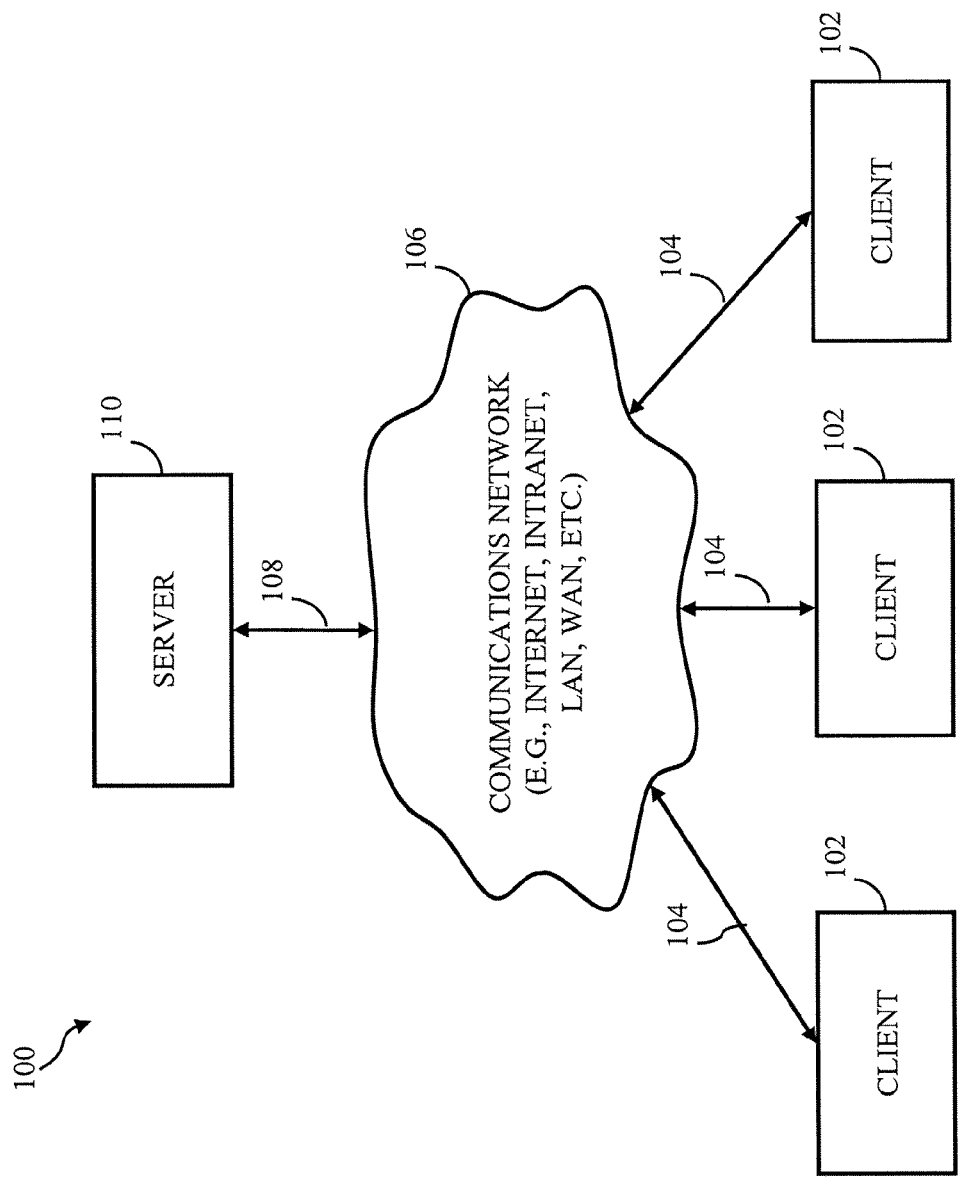
FIG. 1 is a schematic diagram of an illustrative system suitable for implementation of an application that monitors traffic and protects applications from attacks in accordance with some embodiments of the disclosed subject matter.

FIG. 1 is a schematic diagram of an illustrative system 100 suitable for implementation of systems and methods for protecting an application from attack in accordance with some embodiments. Referring to FIG. 1, a system 100 that can be used in implementing some embodiments of the disclosed subject matter is shown. As illustrated, system 100 can include one or more clients 102. Clients 102 can be local to each other or remote from each other, and are connected by one or more communications links 104 to a communications network 106 that is linked via a communications link 108 to a server 110. Various embodiments of the present application can be implemented on at least of the server and the clients.

In system 100, server 110 can be any suitable server for executing an application, such as a processor, a computer, a data processing device, or a combination of such devices. Communications network 106 can be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 104 and 108 can be any communications links suitable for communicating data between clients 102 and server 110, such as network links, dial-up links, wireless links, hard-wired links, etc. Clients 102 can be personal computers, laptop computers, mainframe computers, dumb terminals, data displays, Internet browsers, personal digital assistants (PDAs), two-way pagers, wireless terminals, portable telephones, etc., or any combination of the same. Clients 102 and server 110 can be located at any suitable location. In one embodiment, clients 102 and server 110 can be located within an organization. Alternatively, clients 102 and server 110 can be distributed between multiple organizations.

Figure 2:
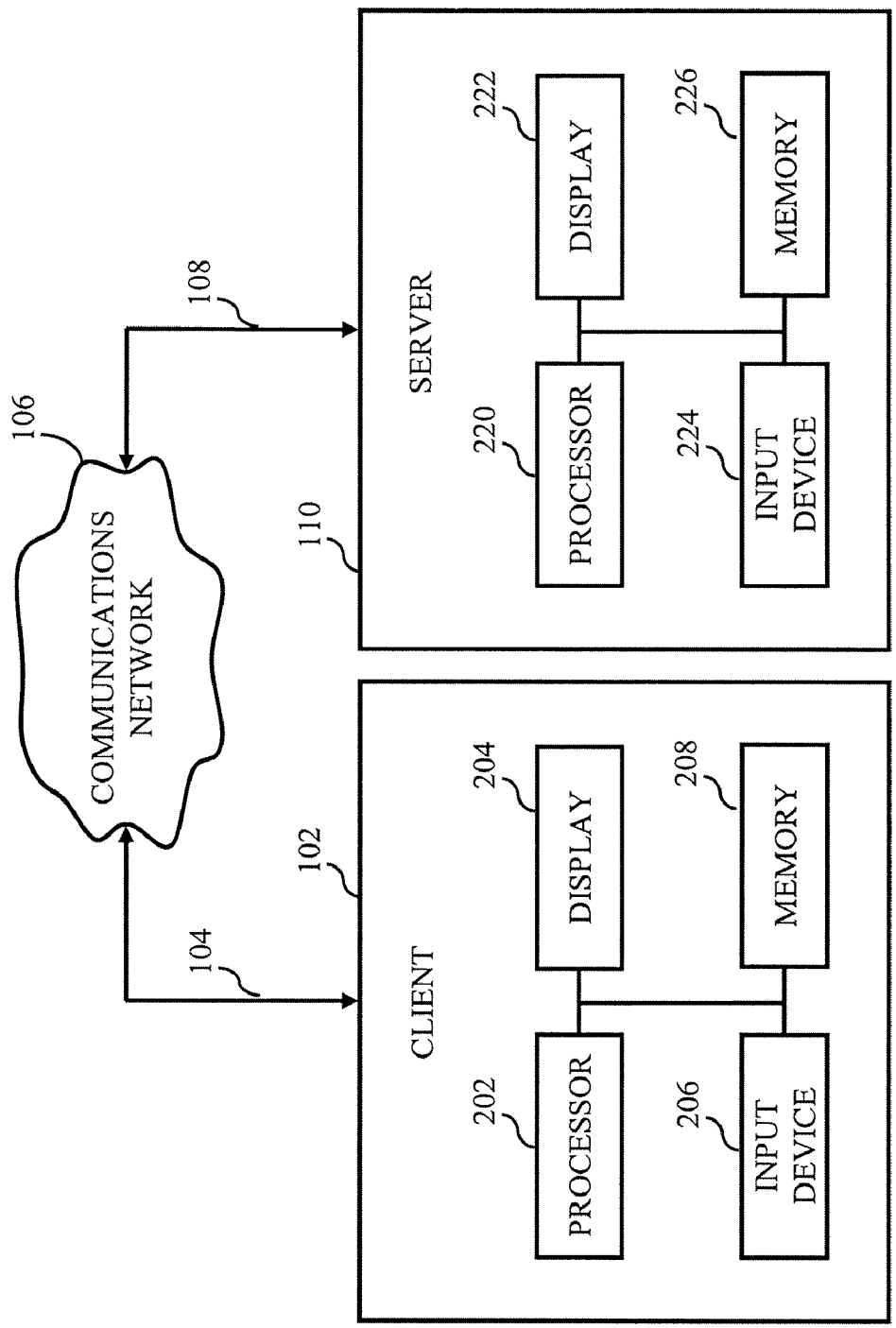
FIG. 2 is a detailed example of the server and one of the clients of FIG. 1 that may be used in accordance with some embodiments of the disclosed subject matter.

The server and one of the clients, which are depicted in FIG. 1, are illustrated in more detail in FIG. 2. Referring to FIG. 2, client 102 can include processor 202, display 204, input device 206, and memory 208, which can be interconnected. In a preferred embodiment, memory 208 contains a storage device for storing a client program for controlling processor 202. Memory 208 can also contain an application for protecting at least one other application from attacks. In some embodiments, applications can be resident in the memory of client 102 or server 110.

Although some embodiments are described herein as being implemented on a client or server, this is only illustrative. The application can be implemented on any suitable platform (e.g., a personal computer (PC), a mainframe computer, a dumb terminal, a data display, a two-way pager, a wireless terminal, a portable telephone, a portable computer, a palmtop computer, a H/PC, an automobile PC, a laptop computer, a personal digital assistant (PDA), a combined cellular phone and PDA, etc.) to provide such features.

Figure 3:
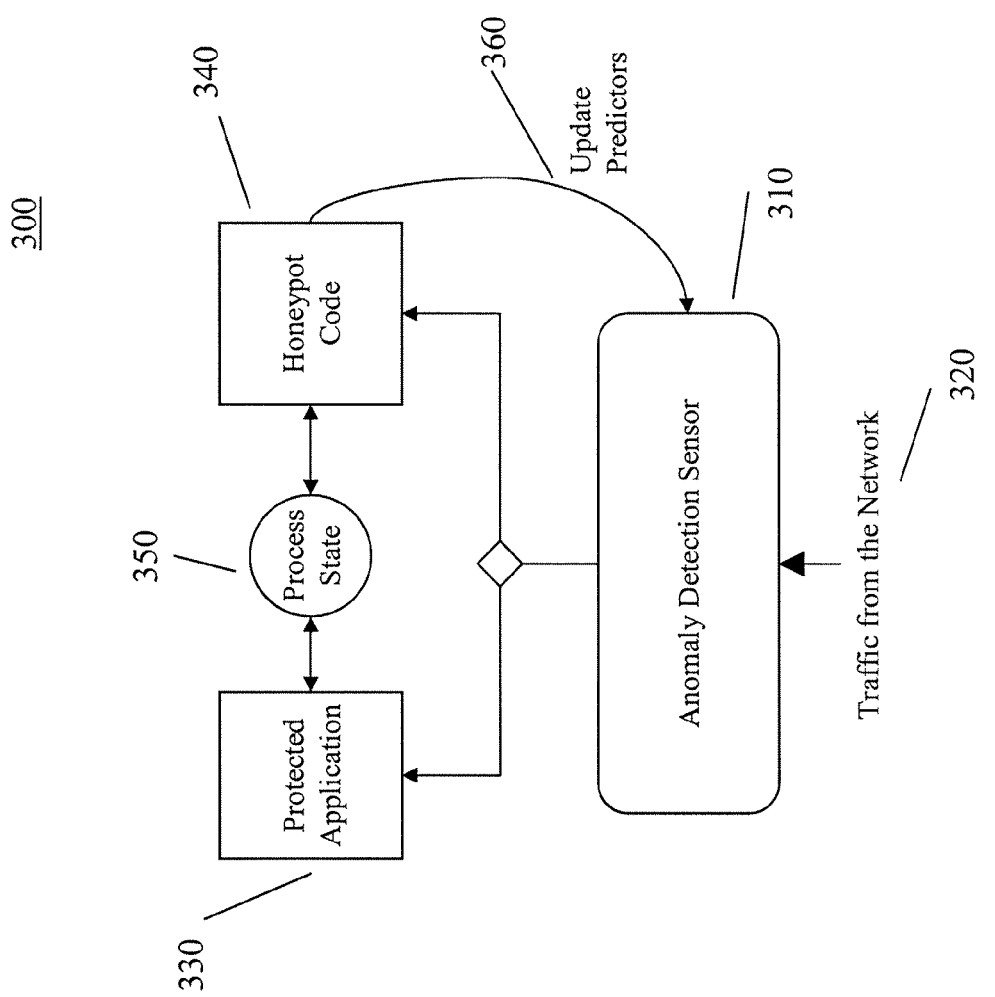
FIG. 3 is a schematic diagram of another illustrative arrangement suitable for monitoring traffic and protecting applications from attacks in accordance with some embodiments of the disclosed subject matter.

A simplified illustration of the system of some embodiments is illustrated in FIG. 3. As shown, system 300 includes an anomaly detection sensor 310. Anomaly detection sensor 310 receives traffic from the network 320. Anomaly detection sensor 310 can route traffic to either a protected application 330 or a honeypot version of the application 340. In some embodiments, anomaly detection sensor 310 can route traffic to protected application 330 or the honeypot 340 based on a prediction made by anomaly detection sensor 310. For example, anomaly detection sensor 310 can make a prediction on traffic from the network 320 based at least in part on performing a payload analysis or analyzing network behavior.

As described previously, the honeypot version of the application 340 is an instance of the protected application 330 that shares substantially all internal state with a regular instance of the application. In some embodiments, the honeypot application can be at least a portion of the protected application itself. Using honeypot 340, attacks against the honeypot 340 are detected and any incurred state changes are discarded. Traffic 320 that is misclassified by the anomaly detection sensor 310 can be validated by the honeypot 340 and can be processed correctly by the system 300 and transparently to the user. Both the honeypot 340 and the protected application 330 are connected to the same process state information 350. Generally, process state information 350 can include, for example, variable values, memory allocation information, state information related to associated components or devices, or any other suitable information that may be needed to define the current state of a process.

In some embodiments, honeypots, such as honeypot 340, can provide anomaly detection sensors or any other suitable component of system 300 with feedback. As shown in FIG. 3, honeypot 340 can provide feedback 360 to anomaly detection sensor 310. For example, honeypot 340 can provide information relating to the attack to the anomaly detection sensor 310. Anomaly detection sensor 310 can use the feedback 360 from honeypot 340 to update the predictors used within anomaly detection sensor 310 or use the feedback 360 in any other suitable approach for tuning anomaly detection sensor 310.

Figure 4:
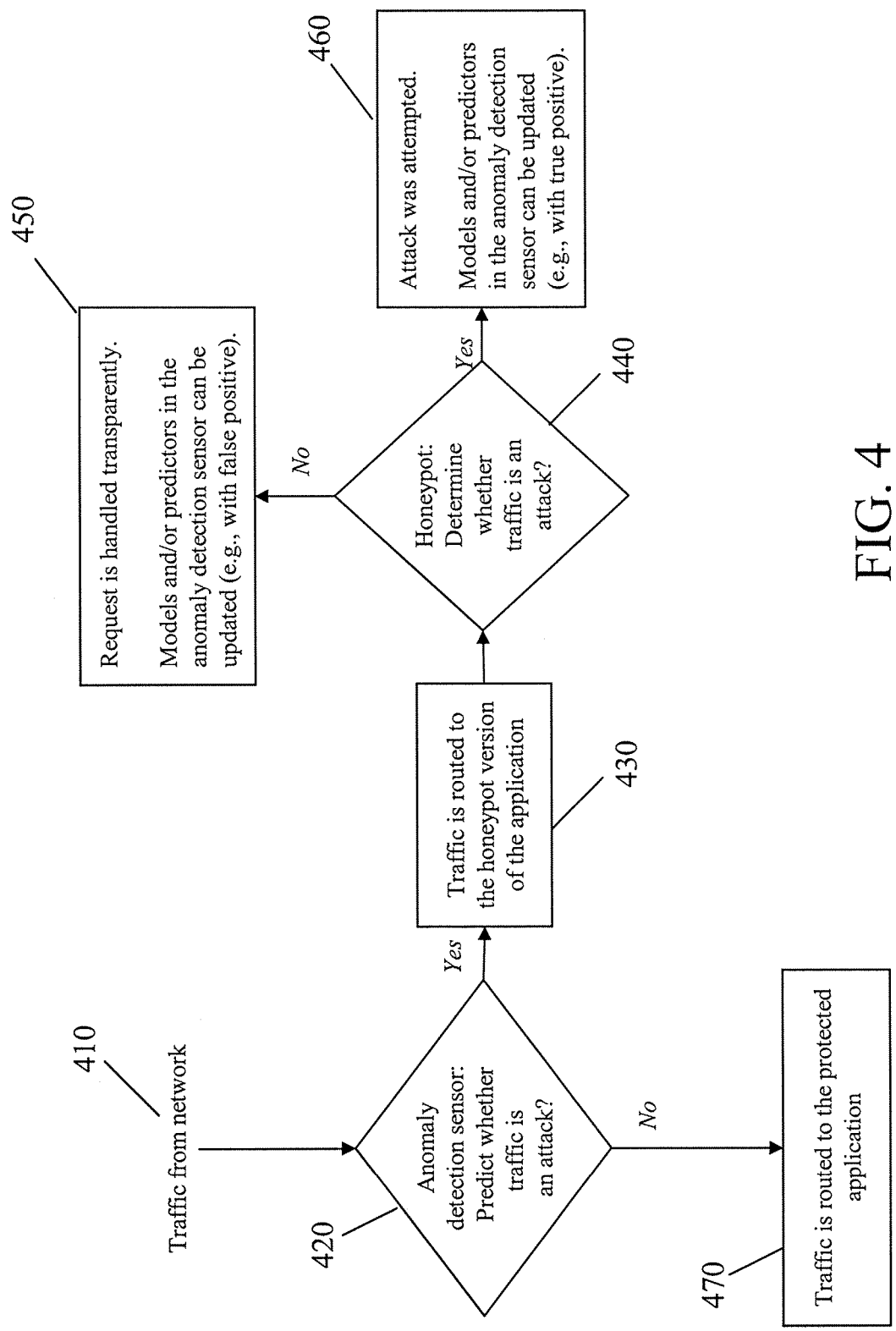
FIG. 4 is an illustrative flow diagram for protecting an application from attacks in accordance with some embodiments of the disclosed subject matter.

FIG. 4 is an illustrative flow diagram illustrating the interaction of the anomaly detection sensor and the honeypot in accordance with some embodiments. Traffic from a network is received by the system at the anomaly detection sensor (410 in FIG. 4). The anomaly detection sensor determines whether or not the received traffic is an attack on the application (420 in FIG. 4).

If the anomaly detection sensor predicts that the received traffic is an attack, the received traffic is routed to the honeypot (430 in FIG. 4). Traffic that reaches the honeypot is processed by the honeypot and monitored for attacks (440 in FIG. 4). If no attack is detected by the honeypot, the processing of the code is handled transparently by the system (450 in FIG. 4). From the user's point of view, it appears as though the traffic was processed by the protected application. The honeypot can also inform the anomaly detection sensor that it made a wrong prediction (450 in FIG. 4). The anomaly detection sensor can use this information to improve future predictions made by the anomaly detection sensor. Otherwise, if the honeypot determines that the received traffic is an attack, the honeypot can discard any state changes caused by the attack (460 in FIG. 4). The honeypot can also inform the anomaly detection sensor of a correct prediction. Information relating to correct predictions can also be used to improve future predictions made by the anomaly detection sensor.

Alternatively, if the anomaly detection sensor predicts that the received traffic is not an attack, the received traffic is routed to the protected application (470 in FIG. 4). In this case, the received traffic is not routed to the honeypot version.

Figure 5:
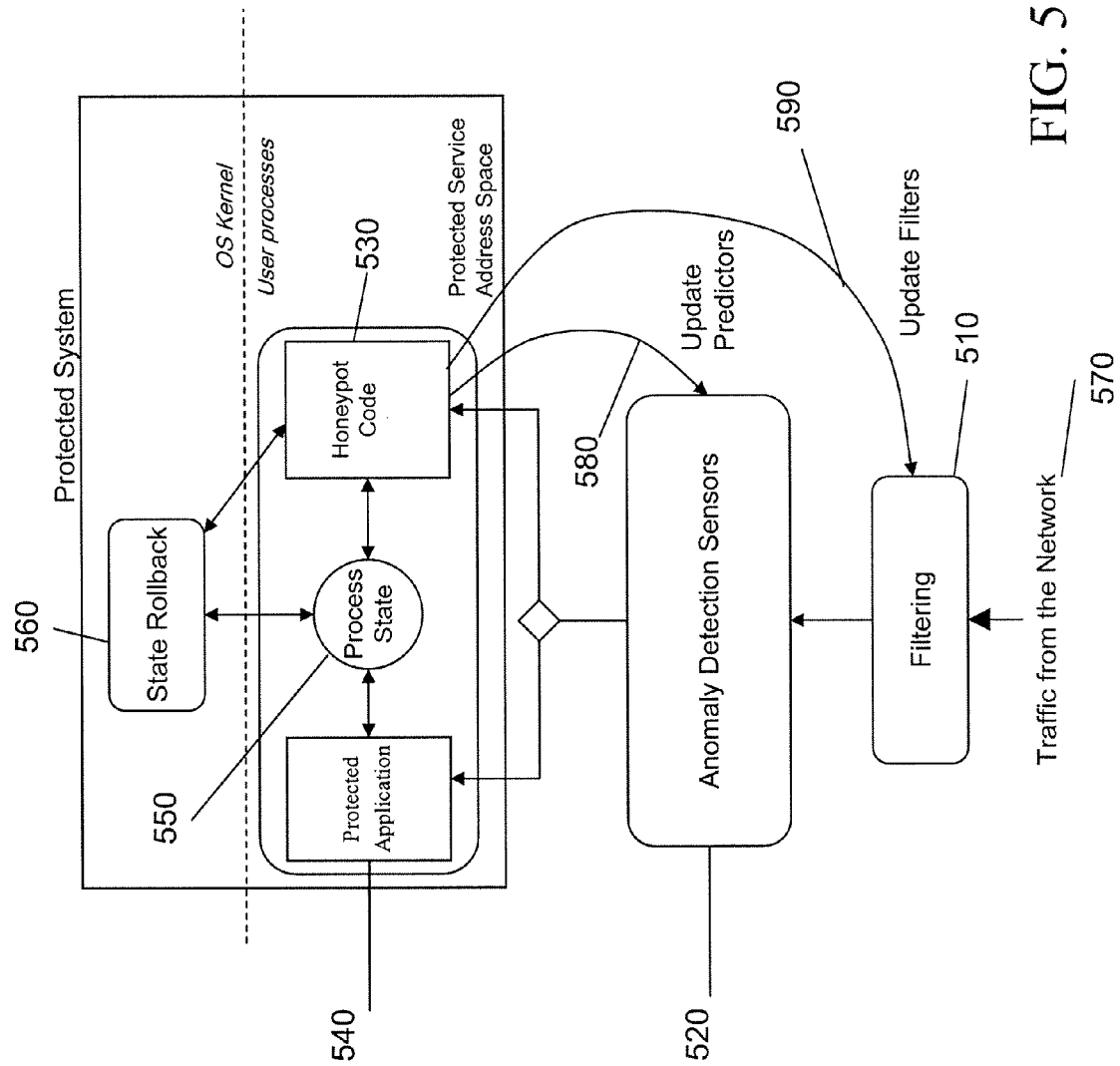
FIG. 5 is a schematic diagram of another illustrative arrangement suitable for monitoring traffic and protecting applications from attacks in accordance with some embodiments of the disclosed subject matter.

FIG. 5 shows another illustrative arrangement for the attack detection system in accordance with some embodiments. In the arrangement of FIG. 5, system 500 includes a filtering engine 510, an array of anomaly detection sensors 520, a honeypot version of the application 530, a protected application 540, a current process state 550, and a saved process statement for rollback 560.

Filtering engine 510 receives traffic from the network 570. Filtering engine 510 can be used by system 500 to block known attacks within the received traffic 570. The filtering can be done, for example, based on payload content, source of the attack, a combination of any suitable filtering methodology, or by any other suitable approach for filtering the received traffic. As shown in FIG. 5, filtering engine 510 can be configured as a layer between the array of anomaly detection sensors 520 and the traffic from the network 570. Filtering engine 510 can be used to drop specific types of traffic before any additional processing is performed.

If traffic from the network 570 passes through filtering engine 510, the array of one or more anomaly detection sensors 520 can be used to process the received traffic 570. Examples of types of anomaly detection sensors 520 that can be used in system 500 include sensors that perform payload analysis and network behavior anomaly detectors. However, it should be noted that various anomaly detection sensors can be used in various embodiments of the disclosed subject matter. In some embodiments, results can improve if the anomaly detection sensors 520 are tuned to a high sensitivity. While this increases the amount of false positives reported by the anomaly detection sensors 520, it further ensure that attacks do not reach the protected application 540.

Based at least in part on the prediction of the one or more anomaly detection sensors 520, system 500 invokes either the regular instance of the protected application 540 or the honeypot version of the application 530. As described previously, the honeypot version of the application 530 is an instrumented instance of the application that shares substantially all internal state with a regular instance of the application. Using honeypot 530, attacks against the honeypot 530 are detected and any incurred state changes are discarded. Both the honeypot 530 and the protected application 540 are connected to the same process state information 550.

However, in response to detecting an attack or failure, honeypot 530 can rollback any state changes to a known good state. For example, honeypot 530 can rollback to the state the protected application 540 had prior to processing the malicious request (e.g., a saved process statement for rollback 560). Alternatively, honeypot 530 can restart the application or initiate a new instance of the application having previously saved state information in response to detecting an attack.

In some embodiments, honeypot 530 can provide filtering engine 510, one or more anomaly detection sensors 520, or any other suitable component of system 500 with feedback. For example, in response to the honeypot 530 detecting an actual attack, determining a false positive, or detecting no attacks, honeypot 530 can provide information to one or more of the anomaly detection sensors 520. The one or more anomaly detection sensors 520 can use the feedback 580 from honeypot 530 to update the predictors used within the one or more anomaly detection sensors 520 or use the feedback 580 in any other suitable approach for tuning the one or more anomaly detection sensors 520. For example, the one or more anomaly detection sensors 520 can use the information to block similar attacks in the future and/or learn from past correct and incorrect predictions. In another example, predictors or prediction models can be updated if no attacks are detected. Any other suitable approach for self-tuning and updating the one or more anomaly detection sensors 520 can also be used.

In another example, in response to the honeypot 530 detecting an actual attack, determining a false positive, or detecting no attacks, honeypot 530 can provide information (e.g., feedback 590) to filtering engine 510. Filtering engine 510 can use the feedback 590 from honeypot 530 to update the filters used by filtering engine 510 or use the feedback 590 in any other suitable approach for tuning the filtering engine 510. For example, filtering engine 510 can use the feedback 590 to block similar attacks in the future and/or learn from past correct and incorrect predictions. Any other suitable approach for self-tuning and updating the filtering engine 510 can also be used.

It should be noted that traffic through system 500, including attack traffic, can interact with the protected application through processing by filtering engine 510 and one or more anomaly detection sensors 520, where side channel access is not permitted.

Some embodiments can be integrated with both servers and clients.

In some embodiments, the shadow honeypot can be tightly coupled with a server. The server application can be protected by having suspicious requests diverted to a honeypot version of the server application in which the server application and the honeypot have mirrored functionality and state. The protected application can be, for example, a web server.

In some embodiments, the shadow honeypot can be tightly coupled with a client. The client application can be protected from, for example, passive attacks where the attacker lures a user of the client to download data containing an attack (e.g., the recent buffer overflow vulnerability in Microsoft Internet Explorer's JPEG handling). The protected application can be used to protect, for example, a web browser or any other application on the client from an attack contained in a single packet, an entire flow, or a set of flows.

Although some embodiments have been described and illustrated in the foregoing description as tightly coupled so that attackers cannot exploit the differences between the state of the honeypot and the state of application because both share the same state, it should be noted that the present disclosure has been made only by way of example, and that numerous changes in the details of construction and combination and arrangement of processes and equipment can be made without departing from the spirit and scope of the disclosed subject matter. For example, a loosely coupled configuration in accordance with some embodiments can be provided. The honeypot can reside on a different system and would not share state with the protected application. This loosely coupled embodiment allows the honeypot to be managed by a separate entity, thereby providing the user with the ability to outsource the management of the honeypot.

As shown, the filtering and anomaly detection components (e.g., filtering engine 510 and one or more anomaly detection sensors 520) can be tightly coupled with the protected application. Alternatively, the filtering and anomaly detection components can be centralized at a natural aggregation point in the network topology, such as the firewall.

Figure 6:
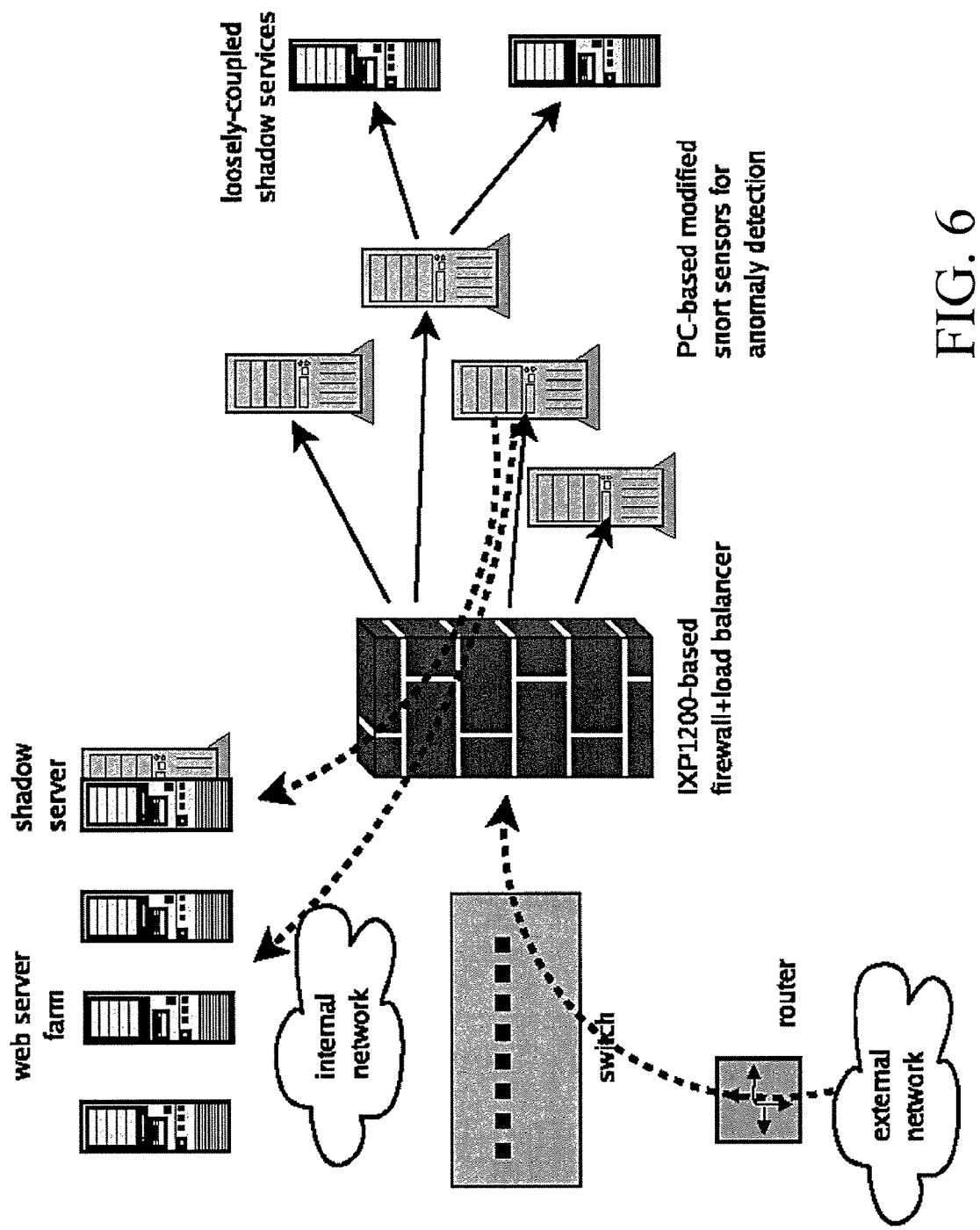
FIG. 6 is a schematic diagram of another illustrative arrangement suitable for monitoring traffic and protecting applications from attacks in accordance with some embodiments of the disclosed subject matter.

FIG. 6 shows a diagram of another illustrative arrangement for the attack detection system in accordance with some embodiments. As shown in the arrangement of FIG. 6, the filtering and anomaly detection components can be implemented with a network processor as a scalable custom load balancer and an array of snort sensors running on computers connected to the network processor board that implement all detection heuristics. For example, the selected network processor can be an IXP1200 network processor. In some embodiments, none of the detection heuristics are implemented on it as network processors are designed for simple forwarding and lack the processing capacity required for the necessary speeds and can be harder to program and debug than other processors. However, in some embodiments, detection heuristics can be implemented on the network processor.

The anomaly detection component provides the ability to divert potentially malicious requests to the honeypot. For example, in web servers, a reasonable definition of the attack context is an HTTP request. For this purpose, the anomaly detection component constructs a request, runs the anomaly detection heuristics, and forwards the request depending on the outcome. Since this processing can be performed at the HTTP level, a HTTP proxy-like function is provided. The anomaly detection components for the tightly coupled honeypot server can be implemented by augmenting an HTTP proxy with the ability to apply the Abstract Payload Execution detection heuristic on incoming request and route them according to its decision.

For the client scenario, an alternating solution based on passive monitoring can be used. In this configuration, the TCP streams of HTTP connections can be reconstructed and the HTTP protocol can be decoded to extract suspicious objects. An object can then be examined directly by applying a heuristic algorithm. If the object is deemed suspicious, a server is launched that replays the suspicious response and directs a honeypot browser to this server.

Payload sifting and buffer overflow detection via abstract payload execution can be used as heuristics for anomaly detection. The payload sifting algorithm derives fingerprints of rapidly spreading worms by identifying popular substrings in network traffic. Buffer overflow detection via abstract payload execution detects buffer overflow attacks by searching for sufficiently long sequences of valid instructions in network traffic. Long sequences of valid instructions can appear in non-malicious data and this is where the honeypot can be implemented. This detection mechanism is attractive because it can be applied to individual attacks and triggers detection upon encountering the first instance of an attack. This is unlike many anomaly detection mechanisms that are required to witness multiple attacks before flagging the attacks as anomalous.

In some embodiments, a code transformation tool can be used to create a honeypot. This tool receives the original application as input and inserts in the honeypot code. While memory-violation errors are primarily described in these embodiments, it should be noted that various embodiments can also be used to catch and detect other violations. TXL, a hybrid functional and rule based language, can be used to perform the code transformations, where GCC C (GNU C Compiler) can be used as the front end. TXL is well suited for performing source-to-source transformation, however a very wide variety of languages could also be used. The grammar responsible for parsing the source input is specified in a notation similar to Extended Backus Naur.

In some embodiments, the honeypot is created by moving all static buffers to the heap. Static buffers can be moved to the heap by dynamically allocating each buffer upon entering the function in which it was previously declared. These buffers can be de-allocated upon exiting the function, whether implicitly (e.g., by reaching the end of the function body) or explicitly (e.g., through a return statement). It should be noted that because the allocated memory regions are instrumented, illegal accesses regarding pointer aliasing are detected.

Figure 7:
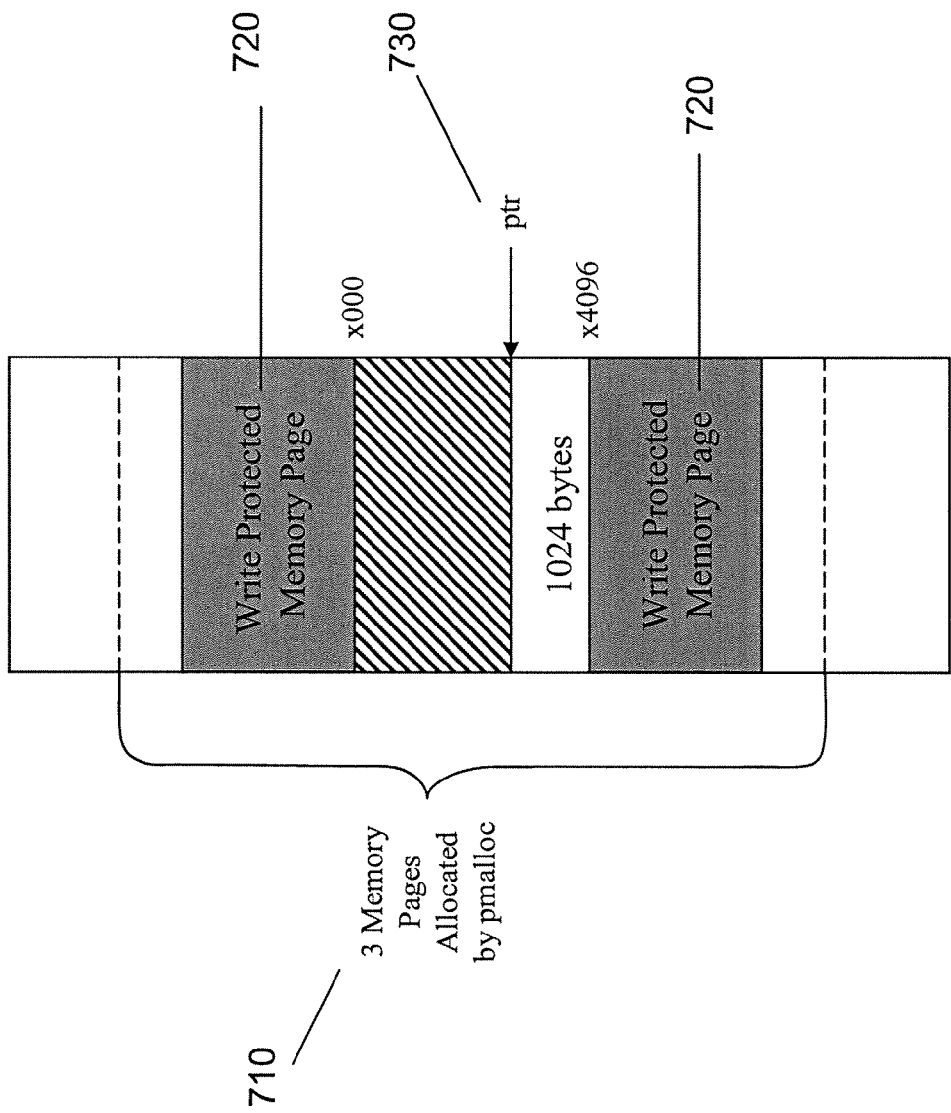
FIG. 7 is an example of a pmalloc( )-based memory allocation as used in accordance with some embodiments of the disclosed subject matter.

For memory allocation, a new version of malloc( ), called pmalloc( ), was created. FIG. 7 is an illustrative example of a pmalloc( )-based memory allocation in accordance with some embodiments. As shown in FIG. 7, the pmalloc( )-based memory allocation allocates three memory pages 710. Besides the basic one page, pmalloc( ) allocates two additional zero filled, write-protected pages 720 that bracket the requested buffer. The extra pages can be mmap( )'ed from /dev/zero as read-only. Because mmap( ) operates at memory page granularity, memory requests are rounded up to the nearest page. The pointer 730 that is returned by pmalloc( ) can be adjusted to immediately catch any buffer overflow or underflow.

Figure 8:
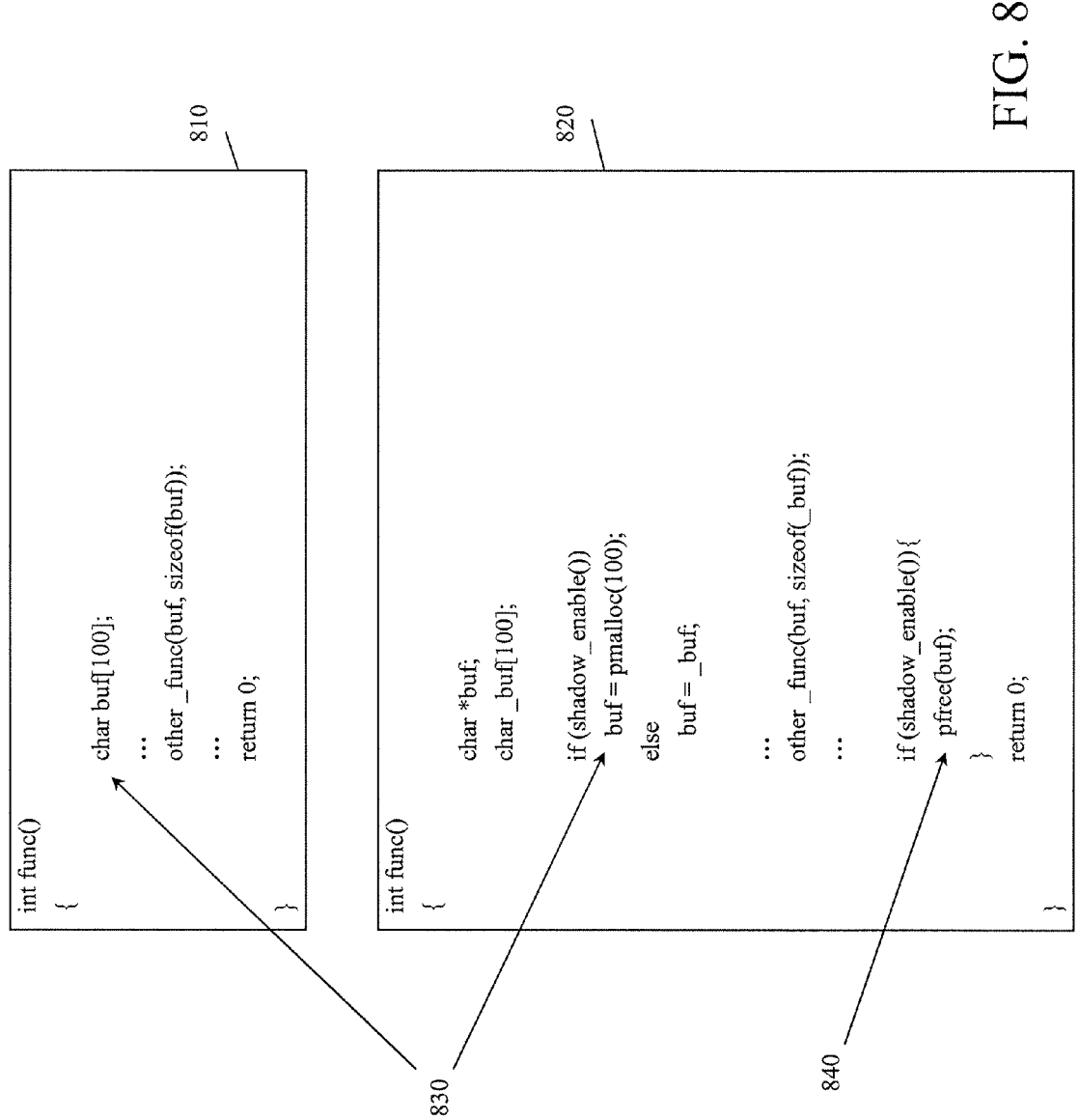
FIG. 8 is an example of a transformation of C code as performed in accordance with some embodiments of the disclosed subject matter.

FIG. 8 shows an example of a code translation in accordance with some embodiments. The original code is shown in block 810 and the translated code is shown in block 820. Buffers that are allocated via malloc( ) can be switched to pmalloc( ) 830. This can be achieved by examining declarations in the source and transforming them to pointers where the size is allocated with a malloc( ) function call. The C grammar can also be adjusted to free the memory 840 before the function returns.

Any overflow or underflow on a buffer allocated via pmalloc( ) can cause the process to receive a Segmentation Violation (SEGV) signal, which is caught by a signal handler that is added to the source code in main( ). The signal handler notifies the operating system to abort all state changes made by the process while processing this request. To do this, a new system call to the operating system can be added called transaction( ). The transaction( ) function is conditionally invoked at three location in the code at the discretion of the shadow_enable( ) function. The shadow_enable( ) function returns true when the honeypot version of the code is running.

The first location that transaction( ) is placed is inside the main processing loop prior to beginning the handling of a new request. This indicates to the operating system that a new transaction has begun. The operating system makes a backup of all memory page permissions and marks all heap memory pages as read-only. As the process executes and modifies these pages, the operating system maintains a copy of the original page and allocates a new page, which is given the permissions the original page from the backup, for the process to use. This is done in the same way that copy-on-write works in modern operating systems. This call to transaction( ) can be placed manually by, for example, the programmer or system designer. Both copies of the page are maintained until transaction( ) is called again, as will be described below.

After the end of handling a request, inside the main processing loop, is the second location transaction( ) can be invoked. It is done here to indicate to the operating system that a transaction has successfully completed. The operating system then discards all original copies of memory pages that have been modified during processing the request. This call to transaction can also be placed manually.

The third location that transaction can be invoked is inside the signal handler. This location can be installed automatically by some embodiments. This is done to indicate to the operating system that an attack (exception) has been detected. The operating system then discards all modified memory pages by restoring the original pages.

In some embodiments, a similar mechanism as the one described above can be built around a file system. This can be done, for example, by using a private copy of a buffer cache for the processing done in the honeypot version of the code.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

What is claimed is:

1. A method for protecting applications from attacks, the method comprising:
    receiving traffic from a communication network that is attempting to reach an application;
    transmitting the received traffic through an anomaly detection component, wherein the anomaly detection component predicts whether the received traffic is a potential attack on the application and wherein the anomaly detection component is tuned to achieve a low false negative rate;
    receiving an indication from the anomaly detection component relating to the prediction of the potential attack on the application;
    in response to receiving the indication from the anomaly detection component, transmitting the received traffic to a honeypot, wherein the honeypot is an instance of the application that shares state information with the application and wherein the honeypot monitors the received traffic for attacks on the application;
    receiving an indication from the honeypot that the received traffic is an attack on the application; and
    receiving an instruction from the honeypot to repair the state information of the application.

2. The method of claim 1, wherein the repair further comprises rolling back the state information of the application to previously saved state information.

3. The method of claim 1, wherein the repair further comprises discarding the state information of the application.

4. The method of claim 1, wherein the repair further comprises initiating a new instance of the application with previously saved state information.

5. The method of claim 1, further comprising filtering the received traffic prior to transmitting the received traffic to the anomaly detection component.

6. The method of claim 5, where the filtering is based on at least one of payload content and source of the attack.

7. The method of claim 1, further comprising transmitting feedback from the honeypot to the anomaly detection component.

8. The method of claim 7, further comprising updating the anomaly detection component based at least in part on the feedback from the honeypot.

9. The method of claim 7, further comprising updating at least one of predictors and models associated with the anomaly detection component.

10. The method of claim 7, further comprising using the feedback to automatically tune the anomaly detection component.

11. The method of claim 7, further comprising using the feedback to automatically tune a filter.

12. The method of claim 1, wherein the application is one of a server application, a client application, an operating system, and an application on a mainframe.

13. A method for protecting applications from attacks, the method comprising:
    receiving traffic from a communication network that is attempting to reach an application;
    transmitting the received traffic through an anomaly detection component, wherein the anomaly detection component predicts whether the received traffic is a potential attack on the application and wherein the anomaly detection component is tuned to achieve a low false negative rate;
    receiving an indication from the anomaly detection component relating to the prediction of the potential attack on the application;
    in response to receiving the indication from the anomaly detection component, transmitting the received traffic to a honeypot, wherein the honeypot is an instance of the application that shares state information with the application and wherein the honeypot monitors the received traffic for attacks on the application;
receiving an indication from the honeypot that the received traffic is an attack on the application;
receiving an instruction from the honeypot to repair the state information of the application;
providing a filter before the anomaly detection component;
transmitting feedback from the honeypot to the filter; and
updating the filter based at least in part on the feedback from the honeypot.

14. A system for protecting applications from attacks, the system comprising:
at least one processor that includes:
an anomaly detection component that is tuned to achieve a low false negative rate, wherein the anomaly detection component is configured to:
receive traffic from a communication network that is attempting to reach an application; and
predict whether the received traffic is a potential attack on the application; and
a honeypot that is an instance of the application that shares state information with the application, wherein the honeypot is configured to:
receive an indication from the anomaly detection component relating to the prediction of the potential attack;
monitor the received traffic for attacks on the application; and
in response to determining that the received traffic is an attack on the application, repair the state information of the application.

15. The system of claim 14, wherein the honeypot is further configured to roll back the state information of the application to previously saved state information.

16. The system of claim 14, wherein the honeypot is further configured to discard the state information of the application.

17. The system of claim 14, wherein the honeypot is further configured to initiate a new instance of the application with previously saved state information.

18. The system of claim 14, further comprising a filter that filters the received traffic prior to transmitting the received traffic to the anomaly detection component.

19. The system of claim 14, wherein the honeypot is further configured to transmit feedback from the honeypot to the anomaly detection component.

20. The system of claim 19, wherein the anomaly detection component is further configured to update the anomaly detection component based at least in part on the feedback from the honeypot.

21. The system of claim 19, wherein the anomaly detection component is further configured to update at least one of predictors and models associated with the anomaly detection component.

22. The system of claim 19, wherein the anomaly detection component is further configured to tune the anomaly detection component based at least in part of the feedback.

23. A system for protecting applications from attacks, the system comprising:
at least one processor that includes:
an anomaly detection component that is tuned to achieve a low false negative rate, wherein the anomaly detection component is configured to receive traffic from a communication network that is attempting to reach an application and predict whether the received traffic is a potential attack on the application;
a honeypot that is an instance of the application that shares state information with the application, wherein the honeypot is configured to receive an indication from the anomaly detection component relating to the prediction of the potential attack, monitor the received traffic for attacks on the application, and, in response to determining that the received traffic is an attack on the application, repair the state information of the application; and
a filter configured to receive the traffic before the anomaly detection component, wherein the filter receives feedback from the honeypot and is updated based at least in part on the feedback from the honeypot.

* * * * *

UNITED STATES PATENT AND TRADEMARK OFFICE
CERTIFICATE OF CORRECTION

| | |
|---|---|
| PATENT NO. | : 7,904,959 B2 |
| APPLICATION NO. | : 11/870043 |
| DATED | : March 8, 2011 |
| INVENTOR(S) | : Stylianos Sidiroglou et al. |

It is certified that error appears in the above-identified patent and that said Letters Patent is hereby corrected as shown below:

Column 1, line 11, prior to "TECHNICAL FIELD," please insert the following paragraph:

-- STATEMENT REGARDING FEDERALLY SPONSORED RESEARCH OR DEVELOPMENT
This invention was made with government support under Grant No. N00014-04-1-0725 awarded by the Office of Naval Research. The government has certain rights in the invention. --

Signed and Sealed this
Twenty-ninth Day of January, 2013

David J. Kappos
*Director of the United States Patent and Trademark Office*